(12) United States Patent
Chow

(10) Patent No.: US 9,079,347 B2
(45) Date of Patent: Jul. 14, 2015

(54) PAVING BLOCK FORMED OF RUBBER CRUMB AND A METHOD OF MANUFACTURING THE SAME

(71) Applicant: Inpress Technologies Inc., Delta (CA)

(72) Inventor: Clark Chow, Richmond, CA (US)

(73) Assignee: Inpress Technologies Inc., Delta (CA)

( * ) Notice: Subject to any disclaimer, the term of this patent is extended or adjusted under 35 U.S.C. 154(b) by 0 days.

(21) Appl. No.: 13/621,778

(22) Filed: Sep. 17, 2012

(65) Prior Publication Data

US 2014/0079483 A1    Mar. 20, 2014

Related U.S. Application Data

(62) Division of application No. 12/890,681, filed on Sep. 26, 2010, now Pat. No. 8,282,311.

(60) Provisional application No. 61/367,342, filed on Jul. 23, 2010.

(51) Int. Cl.
| | |
|---|---|
| B29B 17/00 | (2006.01) |
| B29L 30/00 | (2006.01) |
| B29C 45/00 | (2006.01) |
| B29C 45/72 | (2006.01) |
| E01C 5/18 | (2006.01) |

(52) U.S. Cl.
CPC .............. *B29C 45/72* (2013.01); *B29B 17/0042* (2013.01); *E01C 5/18* (2013.01); *B29C 45/0001* (2013.01); *B29L 2030/00* (2013.01)

(58) Field of Classification Search
USPC ...................................................... 404/32, 34
See application file for complete search history.

(56) References Cited

U.S. PATENT DOCUMENTS

| | | | |
|---|---|---|---|
| 19,592 A | 3/1858 | Tewkesbury | |
| 1,485,810 A | 3/1924 | Parker, Jr. et al. | |
| 2,026,224 A | 3/1930 | Drehmann | |
| 3,775,918 A | 12/1973 | Johnson | |
| 3,827,818 A | 8/1974 | Ruyters | |
| 3,846,057 A * | 11/1974 | Counceller et al. | 425/207 |
| 3,950,908 A | 4/1976 | Van Eyk | |
| 4,386,182 A | 5/1983 | Zijp | |

(Continued)

FOREIGN PATENT DOCUMENTS

| | | |
|---|---|---|
| CA | 2389879 | 12/2003 |
| DE | 19890006277 | 8/1989 |

(Continued)

OTHER PUBLICATIONS

Canadian Industrial Design 73900, IPL Inc., Feb. 10, 1994.

(Continued)

*Primary Examiner* — Abigail A Risic
(74) *Attorney, Agent, or Firm* — Cameron IP

(57) ABSTRACT

A hollow paving block comprises a substantially planar member having a first surface and a second surface opposite the first surface. The first surface of the planar member is a textured surface which functions as a top of the paving block. A side wall extends along and away from a periphery of the second surface of the planar member to define a cavity in the paving block. The side wall has a bevelled edge which extends about a mouth of the cavity. At least one protrusion extends along the second surface of the planar member. The paving block is formed in part from crumb rubber and polyolefin.

8 Claims, 6 Drawing Sheets

(56) References Cited

U.S. PATENT DOCUMENTS

| | | |
|---|---|---|
| 5,157,082 A | 10/1992 | Johnson |
| 5,258,222 A | 11/1993 | Crivelli |
| 5,281,459 A | 1/1994 | Van Eijck |
| 5,312,573 A * | 5/1994 | Rosenbaum et al. ......... 264/148 |
| 5,367,007 A | 11/1994 | Richards |
| 5,403,117 A | 4/1995 | Okuyama et al. |
| 5,403,637 A | 4/1995 | Pickard et al. |
| 5,470,173 A | 11/1995 | Schmidt |
| 5,601,900 A | 2/1997 | Doscher |
| 5,635,551 A * | 6/1997 | Lee .............................. 524/52 |
| 5,714,219 A | 2/1998 | Mashunkashey et al. |
| 5,816,738 A | 10/1998 | Harnapp |
| 6,031,009 A * | 2/2000 | Gonzalez ....................... 521/41 |
| 6,074,127 A | 6/2000 | Suetsugu |
| 6,179,215 B1 | 1/2001 | Shea |
| 6,206,607 B1 | 3/2001 | Medico, Jr. et al. |
| 6,262,175 B1 * | 7/2001 | Jury et al. ...................... 525/93 |
| 6,443,667 B2 | 9/2002 | Brown |
| 6,602,586 B2 | 8/2003 | Kakimoto et al. |
| 6,623,840 B2 | 9/2003 | Hainbach |
| 6,702,514 B2 | 3/2004 | Kaneko et al. |
| 6,960,046 B2 | 11/2005 | Kang |
| 7,331,147 B2 | 2/2008 | Kalisiak et al. |
| 7,344,334 B2 | 3/2008 | Thorkelson |
| 2005/0066623 A1 | 3/2005 | Sippola |
| 2005/0182160 A1 | 8/2005 | Milani Nejad et al. |
| 2009/0297267 A1 | 12/2009 | Glynn |

FOREIGN PATENT DOCUMENTS

| | | |
|---|---|---|
| EP | 0717162 | 6/1996 |
| EP | 0955412 | 11/1999 |
| GB | 369979 | 3/1932 |
| GB | 407433 | 3/1934 |
| GB | 537385 | 6/1941 |
| GB | 2260345 | 4/1993 |
| GB | 2474908 | 5/2011 |
| JP | 09195210 | 7/1997 |

OTHER PUBLICATIONS

Form PCT/ISA/210 issued against PCT/CA2011/050447.
Form PCT/ISA/220 issued against PCT/CA2011/050447.
English Translation of DE19890006277.
English Abstract of JP09195210 obtained from espacenet.com.

* cited by examiner

PAVING BLOCK FORMED OF RUBBER CRUMB AND A METHOD OF MANUFACTURING THE SAME

CROSS-REFERENCE TO RELATED APPLICATION

This application is a divisional application of U.S. patent application Ser. No. 12/890,681 filed in the United States Patent and Trademark Office on Sep. 26, 2012 which claims the benefit of provisional application 61/367,342 filed in the United States Patent and Trademark Office on Jul. 23, 2010, the disclosures of which are incorporated herein by reference and priority to which are claimed.

BACKGROUND OF THE INVENTION

1. Field of the Invention

The present invention relates to paving blocks and, in particular, to a paving block formed in part from crumb rubber and a method of manufacturing the same.

2. Description of the Related Art

Millions of tires are discarded every year in the United States. The United States Environmental Protection Agency estimated that in 2003 alone approximately 290 million tires were discarded in the United States. It is not desirable to send the discarded tires to landfills because large volumes of tires can rapidly fill the limited space available at the landfills. There is accordingly an ongoing need to reduce the number of used tires sent to landfills. One solution is to process the discarded tires to produce crumb rubber which are granules of vulcanized tire rubber with the steel and fibre removed.

It is known to produce crumb rubber through mechanical stepwise grinding or a cryogenic freezing process. In the mechanical process, tires are shredded or cut into smaller pieces which are put through granulators to separate and remove loose steel and fibre. The remaining vulcanized rubber granules are ground in a cracker mill to produce crumb rubber of a desired mesh size. In the cryogenic process, tires are shredded or cut into smaller pieces which are frozen in liquid nitrogen as they pass through a cryogenic tunnel. The frozen tire pieces then pass through a series of cracker mills where they are shattered into their three component parts, namely, rubber, steel and fabric. The cryogenic process is generally more expensive but produces smoother and smaller granules of crumb rubber.

The primary use of crumb rubber is in rubberized asphalt which is a paving material comprised of asphalt concrete mixed with crumb rubber. However, crumb rubber may be used in other applications including pathways, ground cover, under playground equipment, resilient flooring in recreational facilities, running tracks, and synthetic turf fields. Crumb rubber has also been used in modular paving blocks.

U.S. Pat. No. 6,602,586 issued on Aug. 5, 2003 to Kakimoto et al. discloses a paving block designed to be paved on an underlying base to absorb impacts. The block includes rubber chips mixed with a resin binder to form a powdery rubber-containing layer which integrally overlays a vulcanized rubber base. The powdery rubber-containing layer functions to absorb impacts and the rubber chips preferably include crumb rubber.

U.S. Pat. No. 7,344,334 issued on Mar. 15, 2008 to Thorkelson discloses a paver system including at least one substrate and a plurality of paving blocks. Each of the paving blocks has a bottom surface configured to engage a top surface of the substrate, thereby preventing lateral movement of the paving blocks. The paving blocks and substrate may be formed from 20 to 80 mesh rubber crumb and a plastic which acts as a binder and forms a matrix for the crumb rubber.

United States Patent Application Publication Number 2009/0297267 published on Dec. 3, 2009 to Glynn discloses a paving block formed of at least crumb rubber and binder. The paving block is a cast block which is preferably formed by hot melt molding or hot pressure molding. Each block has at least one protruding male connector and one recessed female connector. The female connector is configured to receive a male connector of a similar block, thereby allowing adjacent paving blocks to be connected.

SUMMARY OF THE INVENTION

It is an object of the present invention to provide an improved paving block formed in part from crumb rubber.

It is another object to provide an improved method of manufacturing a paving block formed in part from crumb rubber.

There is accordingly provided a hollow paving block comprising a substantially planar member having a first surface and a second surface opposite the first surface. The first surface of the planar member is a textured surface which functions as a top of the paving block. A side wall extends along and away from a periphery of the second surface of the planar member to define a cavity in the paving block. The side wall has a bevelled edge which extends about a mouth of the cavity. At least one protrusion extends along the second surface of the planar member. The protrusion may be a rib extending along a length of the second surface of the planar member.

The paving block is approximately 50% to 80% by weight crumb rubber which is less than 20 mesh crumb rubber, and approximately 18% to 40% by weight polyolefin having a melting index ranging from approximately 5 g/10 minutes to approximately 50 g/10 minutes. The polyolefin is selected from the group consisting of polyethylene and polypropylene. The paving block may further include additives and colorants. The additives may include titanium dioxide, UV stabilizers, calcium carbonate, talc and flame retardants.

There is also provided a method of manufacturing a paving block. The method comprises the steps of:
- providing a mixture of approximately 50% to 80% by weight crumb rubber which is less than 20 mesh crumb rubber and 18% to 40% by weight polyolefin having a melting index ranging between approximately 5 g/10 minutes and approximately 50 g/10 minutes;
- feeding the mixture of crumb rubber and granular polyolefin into a barrel and screw;
- heating the mixture of crumb rubber and granular polyolefin in the barrel to a temperature between 150° C. and 220° C.;
- conveying the heated mixture of crumb rubber and granular polyolefin along the barrel towards a nozzle; and
- injecting the heated mixture through the nozzle into a mold.

Alternatively, the provided mixture may be approximately 55% to 75% by weight crumb rubber, approximately 23% to 48% by weight polyolefin, less than 10% additives and less than approximately 7% colorants. Still alternatively, the provided mixture may be approximately 60% to 65% by weight crumb rubber, approximately 33% to 38% by weight polyolefin, less than 10% additives and less than approximately 7% colorants. The additives may include titanium dioxide, UV stabilizers, calcium carbonate, talc and flame retardants.

The paving block disclosed herein has the advantage of being provided with a bevelled edge to facilitate setting the paving block in the ground. The paving block disclosed herein also has the advantage of being provided with a hollow structure and protrusions which allow a paving block set in the ground to be anchored so as to restrict lateral movement of the paving block. The paving block disclosed herein still further has the advantage of being provided with a textured outer surface which reduces slippage and increases aesthetics.

The method of manufacturing ,the paving block disclosed herein provides the advantage of reducing the burning and gassing of crumb rubber during the manufacturing process. Furthermore, because the paving block is preferably manufactured from recycled crumb rubber and polyolefin, the method of manufacturing the paving block disclosed herein is environmentally favourable.

BRIEF DESCRIPTIONS OF DRAWINGS

The invention will be more readily understood from the following description of the embodiments thereof given, by way of example only, with reference to the accompanying drawings, in which.

DESCRIPTIONS OF THE PREFERRED EMBODIMENTS

Figure 1:
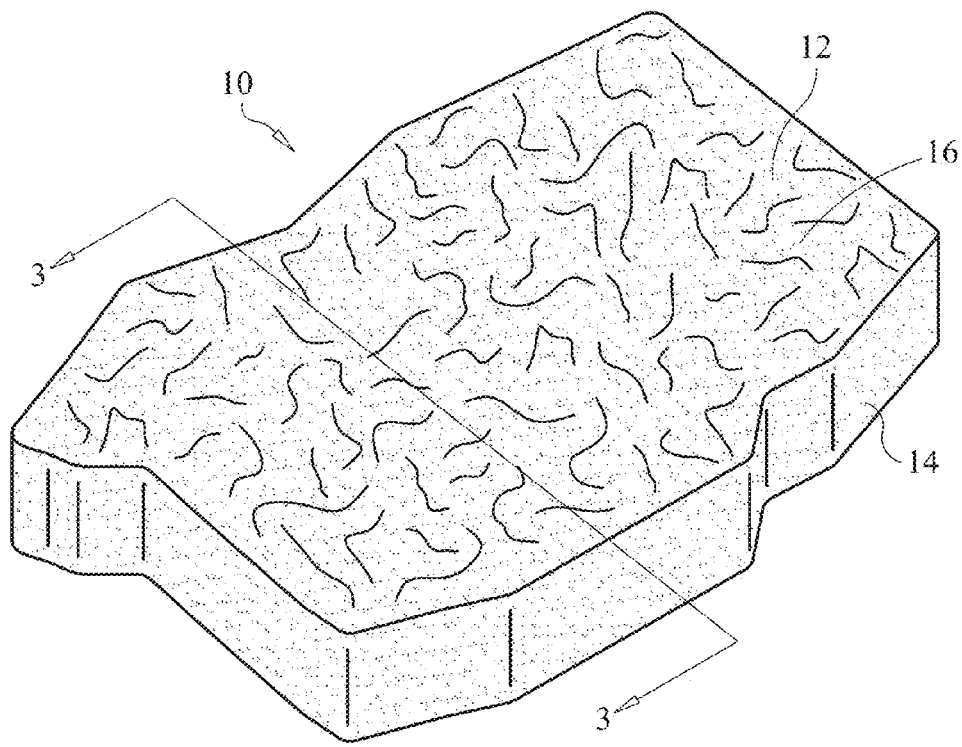
FIG. 1 is a top isometric view of a first embodiment of an improved paving block formed in part from crumb rubber.
Figure 2:
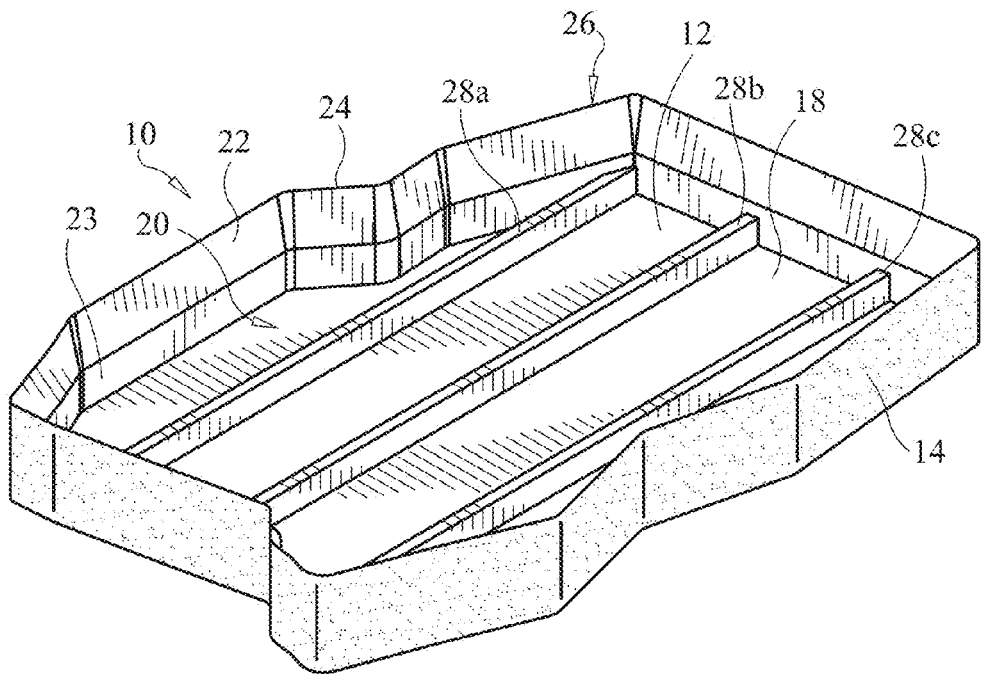
FIG. 2 is a bottom isometric view of the improved paving block of FIG. 1.

Referring to the drawings and first to FIGS. 1 and 2, these show an improved paving block 10. The paving block 10 includes a substantially planar member 12 and a side wall 14 extending along a periphery of the planar member. As best shown in FIG. 1, a first surface 16 of the planar member 12 is an irregular textured surface and functions as a top of the paving block 10. As best shown in FIG. 2, the side wall 14 extends along and away from a periphery of a second surface 18 of the planar member 12 to define a cavity 20 in the paving block 10. There is a bevel 22 on an inner side 23 of the side wall 14. This results in a bevelled edge 24 extending about a mouth 26 of the cavity 20. There are a plurality of protrusions 28a, 28b and 28c on the second surface 18 of the planar member 12. In this example, the protrusions 28a, 28band 28c are in the form of straight, parallel ribs extending along a length of the second surface 18 of the planar member 12. However, in other examples the protrusions may be curved or may be spikes.

Figure 3:
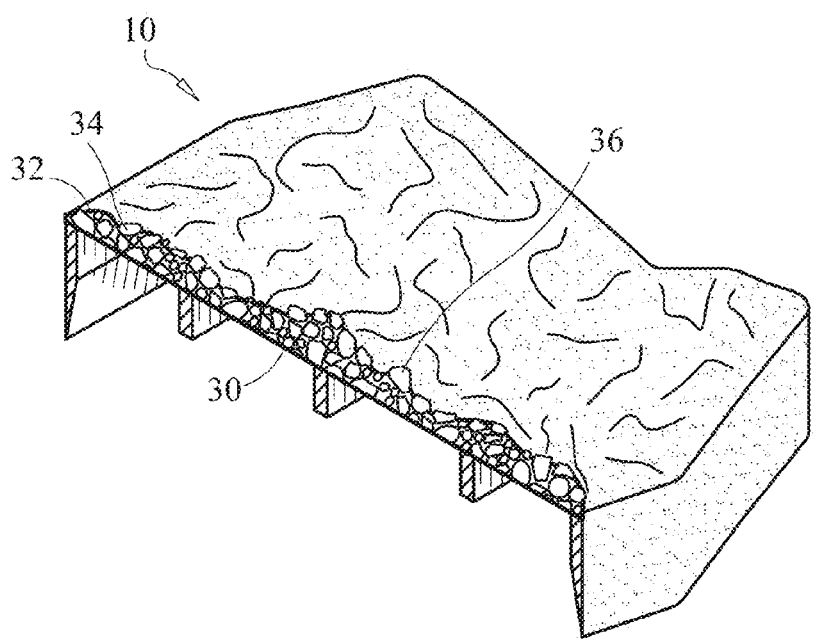
FIG. 3 is a sectional view taken along line 3-3 of FIG. 1.

Referring now to FIG. 3, the paving block 10 is formed from polyolefin 30 and crumb rubber 32. The polyolefin 30 forms a matrix for an inner layer of crumb rubber. Granules 34 and 36 of the crumb rubber 32 May extend through the polyolefin 30. This provides the paving block 10 with a textured appearance and a non-slippery top surface. The paving block 10 may also further include additional additives including colorants, flame retardants and UV stabilizers. In particular, titanium dioxide may be useful for offsetting the black colour of the crumb rubber, allowing the block to be coloured more vibrantly.

Figure 4:
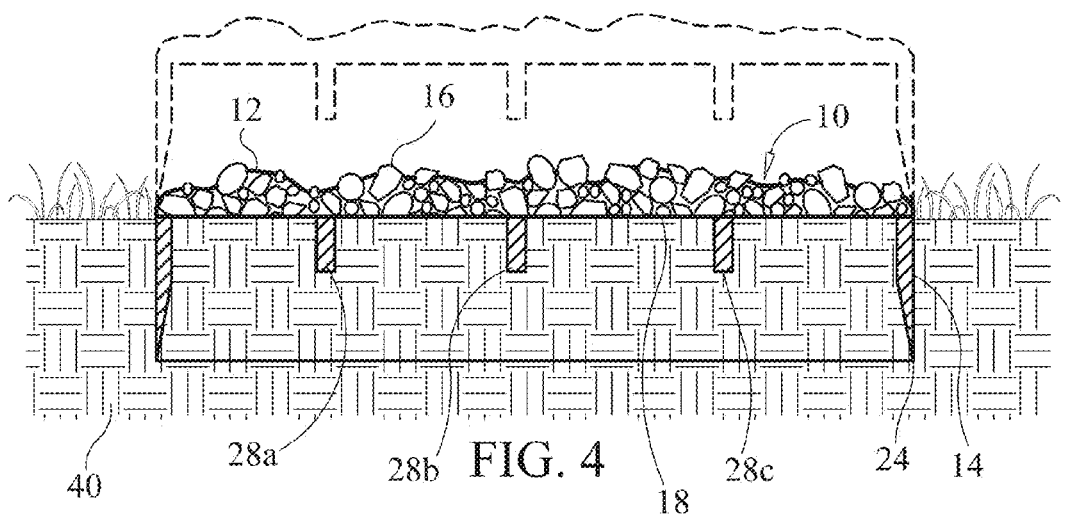
FIG. 4 is a front, sectional view of the paving block of FIG. 1 illustrating the paving block being set in the ground.

In operation, and as shown in FIG. 4, the paving block 10 is positioned at a desired position on the ground 40. This is shown in ghost in FIG. 4. A downward force is then applied to the planar member 12 of the paving block 10 in order to set the paving block in the ground 40. The bevelled edge 24 of paving block 10 facilitates insertion of the side wall 14 into the ground 40. The cavity 20 of the paving block 10 is filled with ground material as the paving block 10 is set into the ground. This allows the protrusions 28a, 28b and 28c on the second surface 18 of the planar member 12 to function as anchors and restrict lateral movement of the paving block 10. Although the paving block 10 shown in FIGS. 1 to 4 has an irregular shape, in other embodiments the paving block may have another shape.

Figure 5:
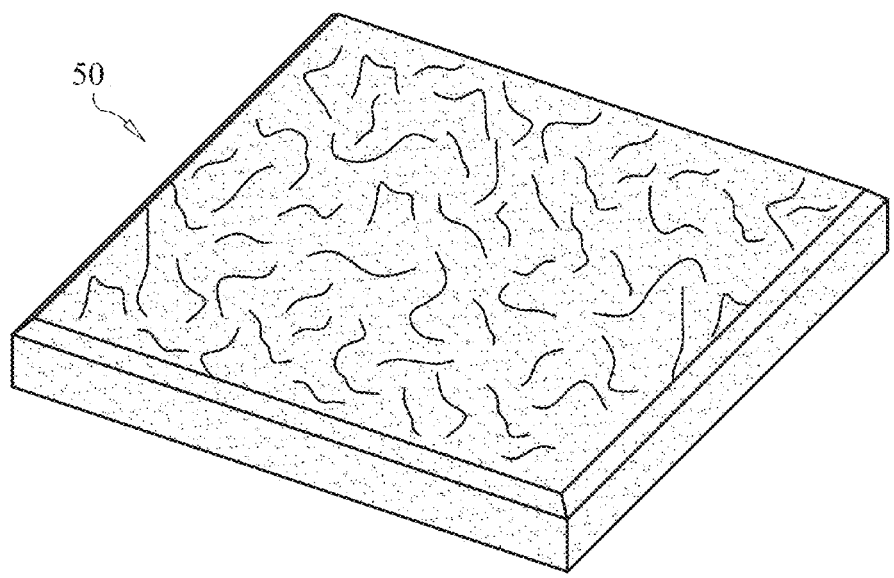
FIG. 5 is a top isometric view of a second embodiment of an improved paving block formed in part from crumb rubber.
Figure 6:
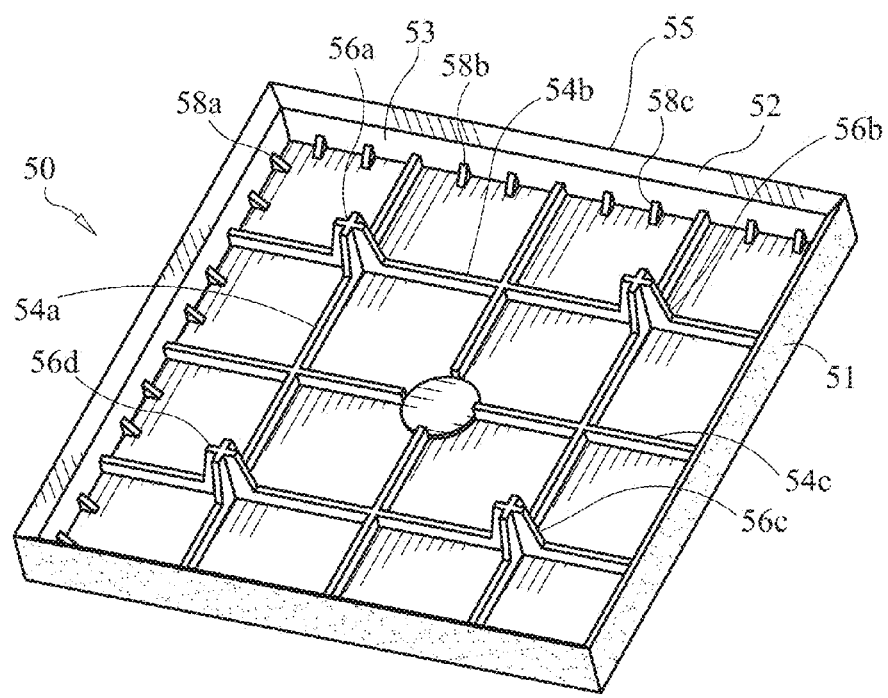
FIG. 6 is a bottom isometric view of the improved paving block of FIG. 5.

FIGS. 5 and 6 show a square paving block 50. The paving block 50 is similar to the paving block of FIGS. 1 to 4 in that the paving block 50 has a bevel 52 on an inner side 53 of a side wall 51 which results in a bevelled edge 55. However, the paving block 50 of FIGS. 5 and 6 is further provided with intersecting ribs 54a, 54b and 54c and a plurality of spikes 56a, 56b, 56c and 56d extending from the ribs. The spikes function as anchors and restrict lateral movement of the paving block 50. The paving block 50 of FIGS. 5 and 6 is still further provided with a plurality of gussets 58a, 58b and 58c which function to brace the side wall 51 of the paving block 50.

Figure 7:
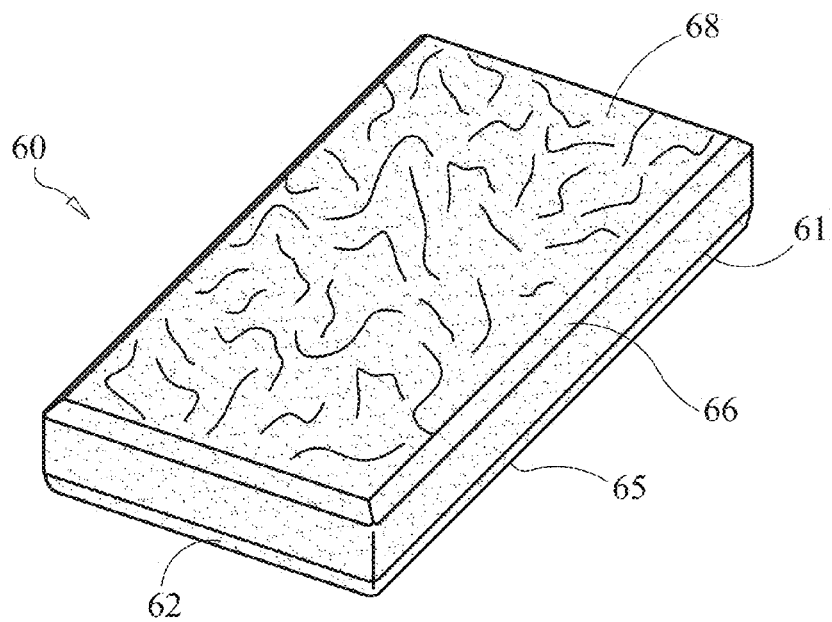
FIG. 7 is a top isometric view of a third embodiment of an improved paving block formed in part from crumb rubber.
Figure 8:
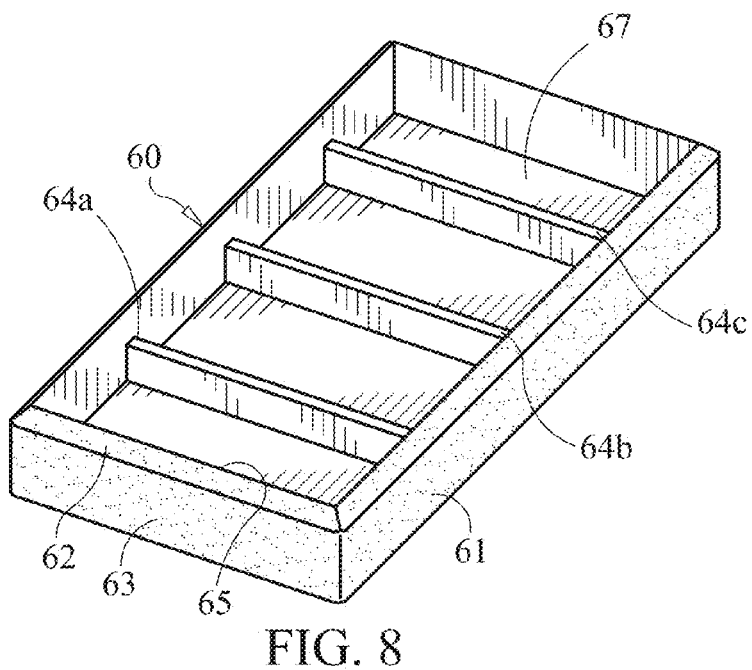
FIG. 8 is a bottom isometric view of the improved paving block of FIG. 7.

FIGS. 7 and 8 show a rectangular paving block 60. The paving block 60 differs from the paving block of FIGS. 1 to 4 in that the paving block 60 has a bevel 62 on an outer side 63 of a side wall 61 which results in a bevelled edge 65. Ribs 64a, 64b and 64c also extend along a width of the paving block 60 as opposed to along a length of the paving block. As best shown in FIG. 7, the paving block 60 is also further provided with a chamfer 66 between the side wall 61 and a top surface 68 of the paving block 60.

Figure 9:
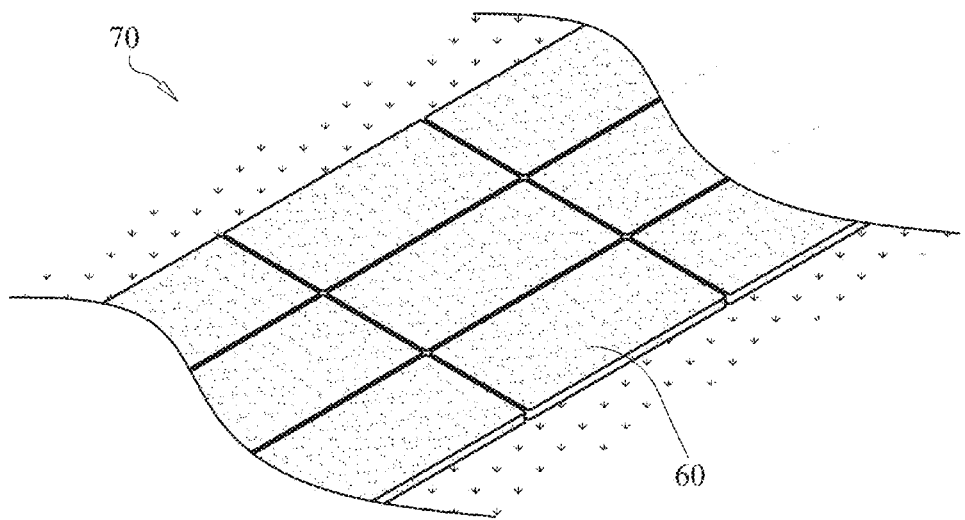
FIG. 9 is a top isometric view of a plurality of improved paving blocks assembled to form a walkway.

The paving blocks disclosed herein may also be assembled in a variety of formations to produce a variety of desired structures. For example, FIG. 9 shows a plurality of the paving block 60 of FIGS. 7 and 8 assembled as a walkway 70.

Figure 10:
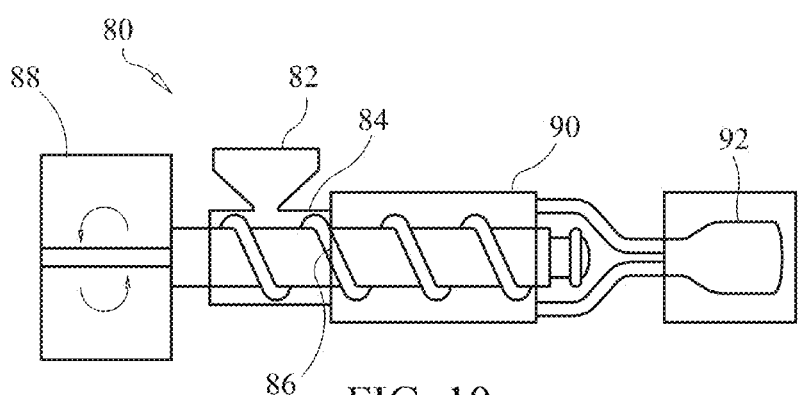
FIG. 10 is a simplified elevation view of an injection molding machine used to produce the improved paving blocks disclosed herein.
Figure 11:
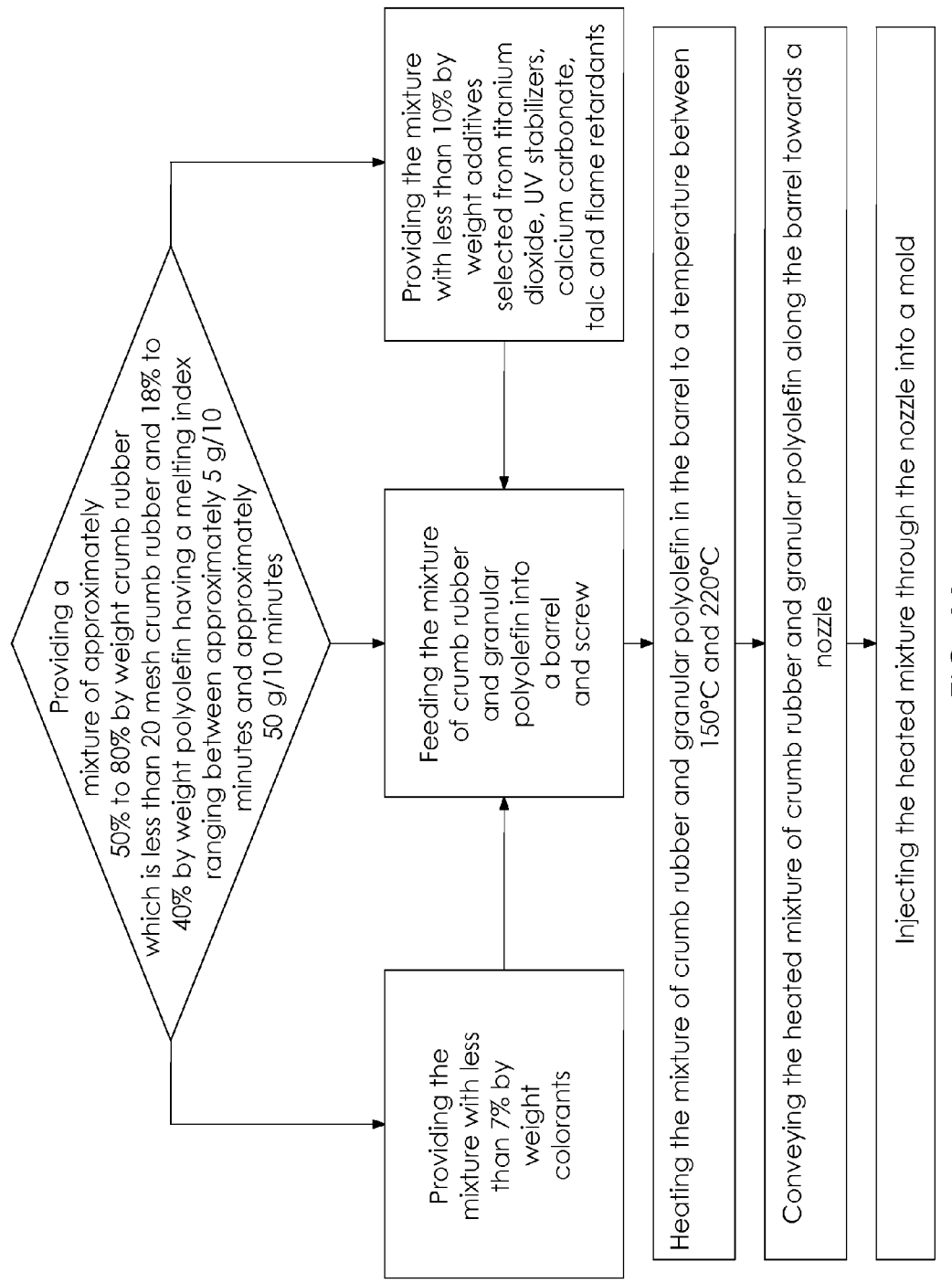
FIG. 11 is a flow chart illustrating a method of manufacturing the improved paving blocks disclosed herein.

The improved paving blocks disclosed herein are manufactured using an injection molding machine 80 similar to the type shown in FIG. 10. The machine 80 includes a feeder 82 in communication with a barrel 84. A screw 86 disposed within the barrel 84 is driven by a motor 88 and conveys a mixture of crumb rubber, polyolefin and any colorants or additives along the barrel 84 while a heater 90 heats the mixture. The heated mixture is injected into a mold 92 and is formed into the paving blocks disclosed herein.

A mixture of crumb rubber and granular polyolefin is heated in a barrel and screw. The barrel is heated to a temperature between 150° C. and 220° C. At this temperature the polyolefin will melt but the crumb rubber will not. The melted polyolefin forms a matrix about the crumb rubber as the screw shears crumb rubber and conveys the mixture towards a nozzle which is in communication with a mold. The melted polyolefin and crumb rubber are injected into the mold. The mold is initially cold so the melted polyolefin solidifies about the crumb rubber to form a paving block. The polyolefin has a melting index ranging between approximately 5 g/10 minutes and approximately 50 g/10 minutes. The polyolefin is selected from the group consisting of polyethylene and polypropylene. When the polyolefin is polyethylene the melting index is determined under the following conditions: 190° C. and 2.16 kg load. This corresponds to Condition E in ASTM test D1238. When the polyolefin is polypropylene the temperature is increased to 230° C.

The mixture may be approximately 50% to 80% by weight crumb rubber, approximately 18% to 40% by weight polyolefin, and approximately 2% by weight titanium dioxide. The crumb rubber is 10 mesh crumb rubber. The polyolefin has a melting index ranging between approximately 10 g/10 minutes and approximately 30 g/10 minutes. Alternatively, the mixture may be approximately 55% to 75% by weight crumb rubber, approximately 23% to 48% by weight polyolefin, less than 10% additives, and less than approximately 7% colorants. Still alternatively, the mixture may be approximately 60% to 65% by weight crumb rubber, approximately 33% to 38% by weight polyolefin, less than 10% additives, and less than approximately 7% colorants. The additives may include titanium dioxide, UV stabilizers, calcium carbonate, talc and flame retardants.

EXAMPLE 1

A paving block as disclosed herein was manufactured using a mixture of 3762 grams of 9018—high density polyethylene from The Dow Chemical Company of Midland, Mich. (30% by weight) and 8778 grams of 10 mesh crumb rubber (70% by weight). The paving block was black in colour.

EXAMPLE 2

A paving block as disclosed herein was manufactured using a mixture of 3330 grams of 5270WZ polypropylene from Total Petrochemicals USA, Inc. of Houston, Tex. (37% by weight) and 5670 grams of 10 mesh crumb rubber (63% by weight). The paving block was black in colour.

EXAMPLE 3

A paving block as disclosed herein was manufactured using a mixture of 4257 grams of recycled polypropylene (33% by weight) and 8385 grams of 10 mesh crumb rubber (65% by weight) and 258 grams of Black masterbatch of colour pigment pellets combined with a plastic resin carrier (2% by weight). The paving block was black in colour.

EXAMPLE 4

A paving block as disclosed herein was manufactured using a mixture of 4257 grams of recycled polypropylene (33% by weight), 8256 grams of 10 mesh crumb rubber (64% by weight) and 387 grams of White masterbatch of colour pigment pellets combined with a plastic resin carrier (3% by weight). The paving block was light grey in colour.

EXAMPLE 5

A paving block as disclosed herein was manufactured using a mixture of 4257 grams of 4720—polypropylene from Total Petrochemicals USA, Inc. of Houston, Tex. (33% by weight), 8127 grams of 10 mesh crumb rubber (63% by weight), 387 grams of Yellow masterbatch of colour pigment pellets combined with a plastic resin carrier (3% by weight) and 129 grams of White masterbatch of colour pigment pellets combined with a plastic resin carrier (1% by weight). The paving block was yellow green in colour.

EXAMPLE 6

A paving block as disclosed herein was manufactured using a mixture of 136 grams of 9018—high density polyethylene from The Dow Chemical Company of Midland, Michigan (34% by weight), 240 grams of 10 mesh crumb rubber (60% by weight) and 24 grams of Red masterbatch of colour pigment pellets combined with a plastic resin carrier (6% by weight). The paving block was dark red in colour demonstrating that a whitening agent is not necessary to color the paving block.

EXAMPLE 7

A paving block as disclosed herein was manufactured using a mixture of 4765 grams of 9018—high density polyethylene from The Dow Chemical Company of Midland, Mich. (38% by weight), 6270 grams of 10 mesh crumb rubber (50% by weight), 1254 grams of White masterbatch of colour pigment pellets combined with a plastic resin carrier (10% by weight) and 251 grams of Red masterbatch of colour pigment pellets combined with a plastic resin carrier (2% by weight). The paving block had a desert rose color and was both rigid and non-slippery. This demonstrates that 50% by weight crumb rubber still provides sufficient rigidity.

It will be understood by a person skilled in the art that although the paving block disclosed herein may be used in a variety of applications including but not limited to landscape paving, lawn edging, driveway edging and decor.

It will further be understood by a person skilled in the art that the method disclosed herein may be used to manufacture objects other than paving blocks, for example, artificial rocks and other articles.

It will be still further understood by a person skilled in the art that many of the details provided above are by way of example only, and are not intended to limit the scope of the invention which is to be determined with reference to the following claims.

What is claimed is:
1. A method of manufacturing an object, the method comprising the steps of:
   providing a mixture of approximately 50% to 80% by weight crumb rubber which is between 10 mesh and less than 20 mesh crumb rubber and 18% to 40% by weight polyolefin having a melting index ranging between approximately 5 g/10 minutes and approximately 50 g/10 minutes;
   feeding the mixture of crumb rubber and granular polyolefin into a barrel and screw;
   heating the mixture of crumb rubber and granular polyolefin in the barrel to a temperature between 150° C. and 220° C. to produce a heated mixture of crumb rubber and melted polyolefin;
   conveying the heated mixture of crumb rubber and melted polyolefin along the barrel towards a nozzle; and injecting the heated mixture of crumb rubber and melted polyolefin through the nozzle into a mold so that melted polyolefin solidifies and forms a matrix about the crumb rubber.

2. The method as claimed in claim 1 wherein the step of providing the mixture includes providing the mixture with 55% to 75% by weight crumb rubber.

3. The method as claimed in claim 1 wherein the step of providing the mixture includes providing the mixture with 60% to 65% by weight crumb rubber.

4. The method as claimed in claim 1 wherein the step of providing the mixture includes providing the mixture with 23% to 48% by weight polyolefin.

5. The method as claimed in claim 1 wherein the step of providing the mixture includes providing the mixture with 33% to 38% by weight polyolefin.

6. The method as claimed in claim 1 wherein the step of providing the mixture further includes providing the mixture with less than 7% by weight colorants.

7. The method as claimed in claim 1 wherein the step of providing the mixture further includes providing the mixture with less than 10% by weight additives selected from the group of additives including titanium dioxide, UV stabilizers, calcium carbonate, talc and flame retardants.

8. A paving block manufactured according to the method of claim 1.

* * * * *